United States Patent
Xin et al.

(10) Patent No.: US 7,630,964 B2
(45) Date of Patent: Dec. 8, 2009

(54) DETERMINING RELEVANCE OF DOCUMENTS TO A QUERY BASED ON IDENTIFIER DISTANCE

(75) Inventors: Guomao Xin, Beijing (CN); Ji-Rong Wen, Beijing (CN); Ruihua Song, Beijing (CN); Shuming Shi, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 11/273,624

(22) Filed: Nov. 14, 2005

(65) Prior Publication Data

US 2007/0112734 A1 May 17, 2007

(51) Int. Cl.
*G06F 7/00* (2006.01)
*G06F 17/30* (2006.01)

(52) U.S. Cl. .......................................... 707/3
(58) Field of Classification Search ................ 707/3
See application file for complete search history.

(56) References Cited

U.S. PATENT DOCUMENTS

| | | | | |
|---|---|---|---|---|
| 5,594,897 A | * | 1/1997 | Goffman | 707/102 |
| 6,092,100 A | * | 7/2000 | Berstis et al. | 709/203 |
| 6,829,599 B2 | * | 12/2004 | Chidlovskii | 707/3 |
| 7,054,855 B2 | * | 5/2006 | Basso et al. | 707/3 |
| 7,197,497 B2 | * | 3/2007 | Cossock | 707/7 |
| 7,206,791 B2 | * | 4/2007 | Hind et al. | 707/104.1 |
| 7,231,399 B1 | * | 6/2007 | Bem et al. | 707/102 |
| 7,257,577 B2 | * | 8/2007 | Fagin et al. | 707/7 |
| 7,480,652 B2 | * | 1/2009 | Wen et al. | 707/5 |
| 2002/0078044 A1 | * | 6/2002 | Song et al. | 707/6 |
| 2003/0195882 A1 | * | 10/2003 | Lee et al. | 707/5 |
| 2005/0010605 A1 | * | 1/2005 | Conrad et al. | 707/104.1 |

OTHER PUBLICATIONS

Crestani et al, ACM Computing Surveys, vol. 30, No. 4, Dec. 1998, "Is This Document Relevant . . . Probably": A Survey of Probablistic Models in Information Retrieval.*

Kraaij et al., SIGIR'02, Aug. 11-15, 2002, ACM 1-58113-561-0/02/0008, The Importance of Prior Probabilities for Entry Page Search.*

Bodoff, ACM Transactions on Information Systems, vol. 22, No. 2, Jul. 2004, Relevance Models to Help Estimate Document and Query Parameters.*

Chi, Chi-Hung and Ding, Chen, "Word Segmentation and Recognition for Web Document Framework," School of Computing, National University of Singapore, 1999 (8 pages).

(Continued)

*Primary Examiner*—Pierre M Vital
*Assistant Examiner*—Jason Liao
(74) *Attorney, Agent, or Firm*—Perkins Coie LLP (57) ABSTRACT

A method and system for determining relevance of a document to a query based on identifier match distance is provided. The relevance system analyzes a training set of queries and documents to determine the relationship between identifier match distance and relevance of a document to a query. The identifier match distance indicates the distance from the end of an identifier of a document to an identifier term that matches a query term. The relevance system generates a prior relevance probability that a document with a certain identifier match distance is relevant to a query. The relevance system uses the prior relevance probabilities to determine relevance of documents to queries based on identifier match distance.

11 Claims, 5 Drawing Sheets

OTHER PUBLICATIONS

Hawking, David et al., "Overview of the TREC-8 Web Track," Feb. 22, 2000 (18 pages).

Kraaij, Wessel et al., "The Importance of Prior Probabilities for Entry Page Search," SIGIR '02, Aug. 11-15, 2002, Tampere, Finland, Copyright 2002 ACM (8 pages).

Ra, Dong-Yul et al., "Yonsei/ETRI at TREC-10: Utilizing Web Document Properties," 2001 (8 pages).

Robertson, S.E. and Walker, S., "Okapi/Keenbow at TREC-8," 1999 (11 pages).

TREC-2004 Web Track Guidelines, Updated Jul. 16, 2004 (7 pages).

Westerveld, Thijs, et al., "Retrieving Web Pages Using Content, Links, URLs and Anchors," University of Twente, The Netherlands, 2001 (10 pages).

Zhai, Chengxiang and Lafferty, John, "A Study of Smoothing Methods for Language Models Applied to Information Retrieval," Proceedings of ACM SIGIR 2001 and ACM SIGIR 2002, Copyright 2004 ACM (34 pages).

\* cited by examiner

DETERMINING RELEVANCE OF DOCUMENTS TO A QUERY BASED ON IDENTIFIER DISTANCE

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on various metrics such as the term frequency and inverse document frequency metric ("tf*idf"). The search engine service may also generate an importance score to indicate the importance of the web page based on various metrics such as Google's PageRank metric. The search engine service then displays to the user links to those web pages in an order that is based on a ranking determined by their relevance and importance.

Some techniques for determining the relevance of a web page to a query factor in whether a query term matches a URL term of the URL of a web page. For example, if a query is "USPTO news," then these techniques may indicate that the web page with the URL of "www.uspto.gov" and the web page with the URL of "www.uspto.gov/news" are more relevant to the query than a web page with the same content but with a URL that did not match a query term. The URL depth priors technique assigns different relevance probabilities based on the URL type. The URL types are ROOT, SUBROOT, PATH, and FILE. A ROOT URL contains only a domain name that is optionally followed by "index.html" (e.g., "www.uspto.gov/index.html"). A SUBROOT type contains only a domain name followed by a single directory that is optionally followed by "index.html" (e.g., "www.uspto.gov/news/index.html"). The PATH type contains a domain name followed by an arbitrarily deep path that is optionally followed by a file name that can only be "index.html" (e.g., "www.uspto.gov/news/2005" or "www.uspto.gov/news/2005/index.html" but not "www.uspto.gov/news/2005/archive.html"). The FILE type is any URL ending with a file name other than 'index.html' (e.g., "www.uspto.gov/news/2005/archive.html").

The URL depth priors technique has achieved acceptable performance when the URL prior probability based on URL type is combined with content relevance for home page and named page searching. (TREC-2004 Web Track Guidelines, Jul. 16, 2004). Home page searching refers to a query submitted by a user when the user wants to find a home page. For example, a user may submit the query "US patent office" when searching for the home page "www.uspto.gov." Named page searching refers to a query submitted by a user when the user wants to find a non-home page that identifies the name of the desired page rather than words describing its topic. For example, a user may submit the query "patent office news" when searching for the named page "www.uspto.gov/news."

The URL depth priors technique, however, may not achieve acceptable performance for topic distillation searching. Topic distillation searching refers to a query submitted to find pages directed to a specific topic. For example, a user may submit the query "patent office 37 CFR revisions" when searching for web pages relating to recent changes to the Code of Federal Regulations affecting the U.S. Patent and Trademark Office.

Since it is difficult to identify whether a query is intended to be a home page, named page, or topic distillation query, the URL depth priors technique may not achieve acceptable performance when used by a general search engine.

SUMMARY

A method and system for determining relevance of a document to a query based on identifier match distance is provided. The relevance system analyzes a training set of queries and documents to determine the relationship between identifier match distance and relevance of a document to a query. The identifier match distance indicates the distance from the end of an identifier of a document to an identifier term that matches a query term. The relevance system generates a prior relevance probability that a document with a certain identifier match distance is relevant to a query. When the prior relevance probability is based on identifier match distance, the relevance derived from the prior relevance probability can achieve acceptable performance regardless of whether the query is a home page, a named page, or a topic distillation query. The relevance system may combine a content relevance to the query derived from the content of the document and an identifier relevance to generate an overall relevance for the document to the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining relevance of a document to a query based on identifier match distance is provided. In one embodiment, the relevance system analyzes a training set of queries and documents to determine the relationship between identifier match distance and relevance of a document to a query. The identifier match distance indicates the distance from the end of an identifier of a document to an identifier term that matches a query term. For example, when a document is a web page, the identifier of the web page is a URL. A URL has a depth that is defined by the number of its levels or layers. For example, the URL "www.uspto.gov/news/index.html" has the three levels of "www.uspto.gov," "news," and "index.html." If a query contains the query term "news," then there is a URL match at the second level and the URL match distance is 1 (i.e., the URL depth of 3 minus the URL match depth of 2). The relevance system generates a prior relevance probability that a document with a certain identifier match distance is relevant to a query. When the prior relevance probability is based on identifier match distance, the relevance derived from the prior relevance probability can achieve acceptable performance regardless of whether the query is a home page, a named page, or a topic distillation query. The relevance system may combine a content relevance to the query derived from the content of the document and an identifier relevance to generate an overall relevance for the document to the query. For example, the content relevance may be derived using a conventional probability model or language model, and the overall relevance may be a weighted linear combination of the content relevance and the identifier relevance. In this way, the relevance system can factor in to the relevance of a document to a query a match between a query term and an identifier term in a way that is independent of query type.

In one embodiment, the relevance system defines a URL match type based on the distance between the depth of the URL and the depth of the match. The relevance system uses four match types: 0, 1, 2, and no match. A URL match type of 0 indicates that the distance between the URL depth and the URL match depth is 0 meaning that a URL term match occurs in the last level of the URL. A URL match type of 1 indicates that the deepest URL term match occurs in the second to the last level of the URL. A URL match type of 2 indicates that the deepest URL term match occurs at a level other than the last two levels. A URL match type of no match indicates that no URL term matches a query term. For example, the query "wireless communication" matches the URL "cio.doe.gov/wireless/wwg/wwg_index.htm" with a URL match type of 2, matches the URL "cio.doe.gov/wireless/" with a URL match type of 0, and does not match the URL "cio.doe.gov" so its URL match type is no match.

In one embodiment, the relevance system represents the prior relevance probability given the URL match type by the following equation:

$$P(TD \vee HP \vee NP | t) = P(TD|t) + P(HP|t) + P(NP|t) \qquad (1)$$

where t represents the URL match type and TD, HP, and NP represent a topic distillation, home page, and named page query, respectively. Equation 1 indicates the probability that a web page is relevant given the URL match type. By applying Bayes' rule, Equation 1 can be written as the following equation:

$$P(TD \vee HP \vee NP | t) = \frac{P(t|TD)P(TD) + P(t|HP)P(HP) + P(t|NP)P(NP)}{P(t)} \qquad (2)$$

where $P(t)$ represents the probability of the URL match type being t. In one embodiment, the relevance system assumes no knowledge about the proportions of the topic distillation, the home page, and the named page queries. As a result, the relevance system uses equal probabilities as represented by the following equation:

$$P(NP) = P(HP) = P(TD) = 1/3 \qquad (3)$$

Using this assumption, the relevance system estimates the P(t) by the following equation:

$$c(t,TD)/3c(TD) + c(t,HP)/3c(HP) + c(t,NP)/3c(NP) \qquad (4)$$

where c(t,TD) represents the number of relevant pages for topic distillation queries in the training data with a URL match type of t, c(TD) represents the number of all relevant pages for topic distillation queries in the training data, and similarly for home pages and named pages. The value for c(TD) is typically not equal to the number of queries since a topic distillation query usually has more than one relevant document, whereas each home page query and named page query typically has only one relevant document.

The relevance system estimates P(t) based on the training data using the following equation:

$$P(t) = \frac{1}{3} \left[ \frac{\sum_{i=1}^{n_{td}} c_i(t)}{n_{td} \cdot N} + \frac{\sum_{j=1}^{n_{hp}} c_j(t)}{n_{hp} \cdot N} + \frac{\sum_{k=1}^{n_{np}} c_k(t)}{n_{np} \cdot N} \right] \qquad (5)$$

where $n_{td}$, $n_{hp}$, and $n_{np}$ represent the number of topic distillation, home page, and named page queries, respectively, and $c_i(t)$, $c_j(t)$, and $c_k(t)$ represents the count of topic distillation, home page, and named page web pages, respectively, among the top N web pages returned by a query. The relevance system represents Equation 5 by discarding the constants 3 and N and multiplying by $n_{td}$ as the following equation:

$$P(t) \propto \sum_{i=1}^{n_{td}} c_i(t) + \frac{n_{td}}{n_{hp}} \sum_{j=1}^{n_{hp}} c_j(t) + \frac{n_{td}}{n_{np}} \sum_{k=1}^{n_{np}} c_k(t) \qquad (6)$$

In one embodiment, the relevance system uses as the training set the .GOV web page set generated in 2002 and a set of queries from various Text Retrieval Conferences ("TRECs"). The relevance system uses Equations 2 and 6 to generate the prior relevance probabilities from the posterior relevance probabilities of Table 1.

TABLE 1

| Type | Posterior | .GOV | Prior |
|---|---|---|---|
| 0 | 0.498 | 6202 | 0.0381 |
| 1 | 0.086 | 8814 | 0.0046 |
| >=2 | 0.043 | 22628 | 0.0009 |
| No Match | 0.373 | 110142 | 0.0016 |
| Total | 1.000 | 147786 | |

In one embodiment, the relevance system generates a relevance score by combining a content relevance score derived from a probability model with a URL relevance score. A probability model may assume that there is an ideal subset R that contains all web pages which the user prefers as the result for query Q. The relevance system may combine the probability model content relevance score and the URL relevance score according to the following equation:

$$S_{combi} = S_D + w_U S_U \qquad (7)$$

where $S_{combi}$ is the combined score, $S_D$ is the content relevance score of the probability model, $S_U$ is the URL relevance score, and $w_U$ is the weight for the URL relevance score. The probability model relevance score may be calculated using the BM25 formula, which may be represented by the following equation:

$$RSV(D, Q) = \sum_{i \in Q} \frac{(k_1 + 1)tf_i}{k_1\left((1-b) + b\frac{dl}{avdl}\right) + tf_i} \log\frac{N - df_i + 0.5}{df_i + 0.5} \quad (8)$$

where RSV(D,Q) is the relevance of query Q to web page D, i is a term in query Q, $tf_i$ and $df_i$ are term frequency and web page frequency of word i, respectively, N is the total number of web pages in the collection, dl is web page length, avdl is average web page length, and $k_1$ and b are parameters. Since RSV is query dependent and $S_U$ is query independent, the relevance system may normalize RSV so that it is also query independent. In such a case, the query divides Equation 8 by the following equation:

$$\sum_{i \in Q} (k_1 + 1)\log\frac{N - df_i + 0.5}{df_i + 0.5} \quad (9)$$

The division results in RSV being in the range of 0 to 1.

In one embodiment, the relevance system may use various formulas to calculate the URL relevance score. For example, the relevance system may represent the URL relevance score as the prior probability of Table 1 as represented by the following equation:

$$S_1 = P(TD \vee NP \vee HP | \text{type}(U,Q)) \quad (10)$$

where type(U,Q) represents the URL match type of URL U to query Q.

Alternatively, the relevance system may represent the URL relevance score based on a variation of BM25 as represented by the following equation:

$$S_2 = \sum_{i \in Q} tf_i \log\frac{N - df_i + 0.5}{df_i + 0.5} \quad (11)$$

where $tf_i$ is a Boolean indicating whether the query term i is in the URL and $df_i$ represents the number of occurrences of the query term i in the web page. The relevance system may normalize this URL relevance score to give a query independent score by dividing by the following equation:

$$\sum_{i \in Q} \log\frac{N - df_i + 0.5}{df_i + 0.5} \quad (12)$$

As yet another alternative, the relevance system may use a URL relevance score that is a combination of the URL hit relevance scores of Equations 10 and 11 as represented by the following equation:

$$S_3 = S_1 \cdot S_2 \quad (13)$$

In one embodiment, the relevance system generates a relevance score by combining a content relevance score derived from a language model with the URL relevance score. A language model determines the content relevance score based on the conditional probability that web page D is a desired web page given query Q. The relevance system may combine the language model content relevance score and the URL relevance score according to the following equation:

$$P(D|Q) \propto P(Q|D)P(R|\text{type}(U,Q)) \quad (14)$$

where P(D|Q) is the probability that web page D is desired given query Q, P(Q|D) is the probability that web page D was generated from query Q, and P(R|type(U,Q)) is the URL prior relevance probability as shown in Table 1.

In one embodiment, the relevance system uses an expanded match technique to determine whether a URL term matches a query. The expanded match techniques include an acronym match, a concatenation match, and a fuzzy match. The acronym match technique assumes that acronyms in a URL are often the concatenation of the first character of each word of a full name. For example, the URL term "usda" may be an acronym for the "United States Department of Agriculture." The acronym match technique generates an acronym from the first letters of the words of the query that may optionally exclude noise words such as "of," "and," and "the." The acronym match technique then compares the acronym to the URL and may find a match when the URL contains a substring of the acronym. For example, if the query is "white house office of national AIDS policy," then the acronym may be "whoonap" or "whonap." If the URL is "http://clinton2.nara.gov/onap/," then a substring of the first acronym matches "onap." If a substring of the acronym is found, the relevance system maps the URL word to the set of query terms whose first characters are matched. In this example, the relevance system maps "onap" to "office national AIDS policy." The relevance system may also map "onap" to "of national AIDS policy." To prevent such an incorrect mapping, the relevance system may assign higher priority to acronyms that do not include noise words.

The concatenation match technique identifies a match when a URL term is a concatenation of whole query terms, prefix of query terms, or a combination of whole and prefix of query terms. For example, the query "Parent's Guide to Internet Safety" matches the URL of "http://www.fbi.gov/publications/pguide/pguide.htm" because "pguide" is a concatenation of the first character "p" of "parent's" and the word "guide."

The fuzzy match technique identifies a match when a URL does not exactly match a derivation of the query. For example, the query "FDA Human Gene Therapy" is a fuzzy match to the URL "http://www.fda.gov/cberlinfosheets/genezn.htm" because "gene" from the query is a partial of the URL word of "genezen." The relevance system may represent a fuzzy match when the following conditions are satisfied:

$$|q \cap u| > \text{Threshold}_1 \quad (15)$$

$$\frac{\sum_{q_j \in Q} |q_j \cap u|}{|u|} > \text{Threshold}_2 \quad (16)$$

where q is a query term, u is a URL word, |a| represents the number of characters in string a, and a⌒b represents the longest prefix of a that is a substring of b. The relevance system may set $\text{Threshold}_1$ to 3 and $\text{Threshold}_2$ to 0.6.

Figure 1:
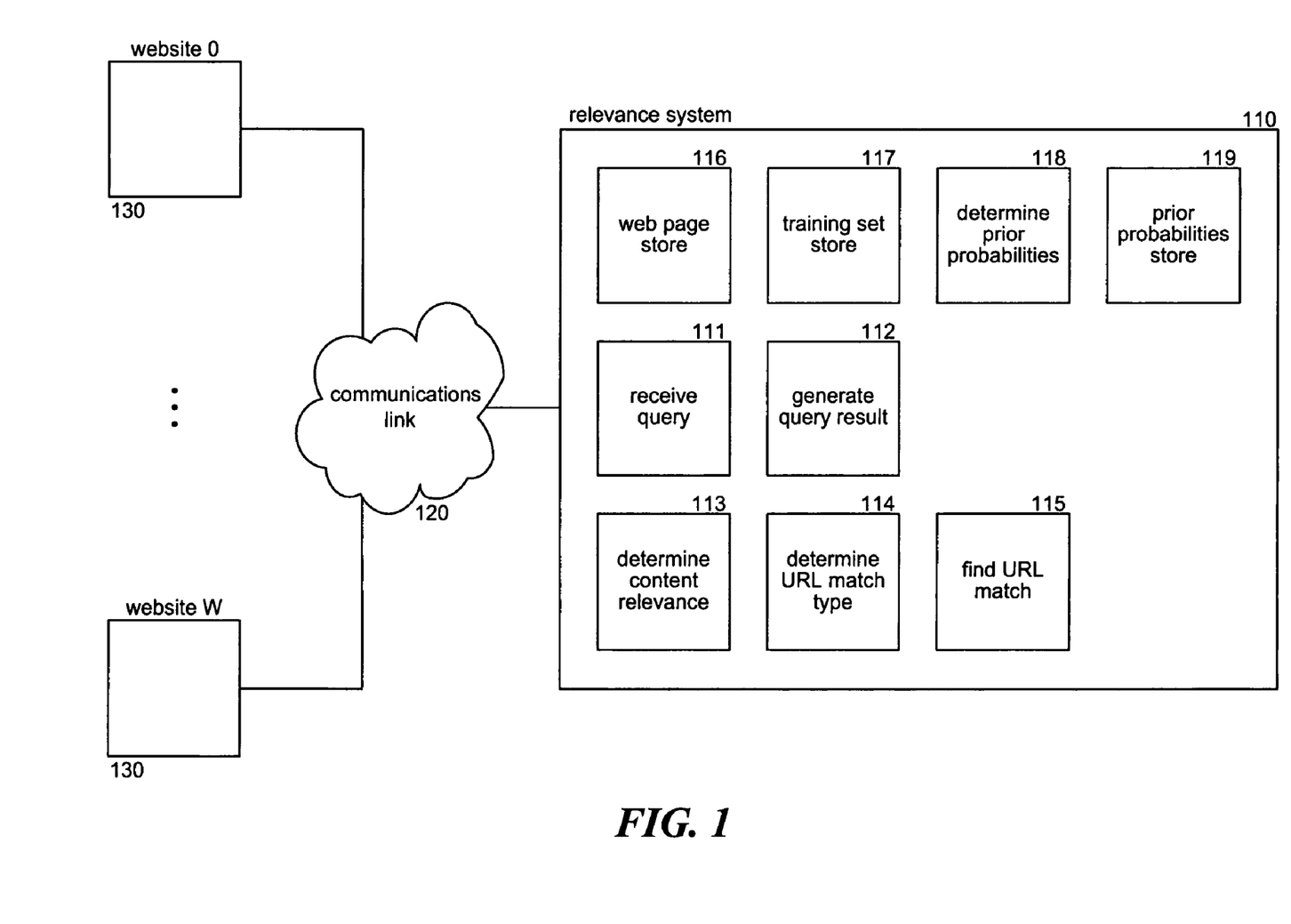
FIG. 1 is a block diagram that illustrates components of the relevance system in one embodiment.

FIG. 1 is a block diagram that illustrates components of the relevance system in one embodiment. The relevance system 110 is connected to web sites 130 via communications link 120. The relevance system includes a receive query component 111, a generate query result component 112, a determine content relevance component 113, a determine URL match type component 114, and a find URL match component 115. The relevance system also includes a web page store 116, a training set store 117, a determine prior probabilities component 118, and a prior probabilities store 119. The web page store contains the URLs of web pages of web sites that are accessible via the communications link. The web page store may be generated using a conventional crawling technique. The training set store contains queries and web pages that are relevant to the query. The web pages of the training set store are identified by their URLs, and the queries may indicate whether they are topic distillation, home page, or named page queries. The determine prior probabilities component analyzes the training set store to determine the prior relevance probabilities associated with the URL match types and stores the prior relevance probabilities in the prior probabilities store. The receive query component receives queries from users and invokes the generate query result component to generate the results for the queries. The generate query result component invokes the determine content relevance component to determine the relevance of web pages to a query based on their content. The generate query result component also determines the URL relevance of web pages to the query by invoking the determine URL match type component, which invokes the find URL match component. The generate query result component combines the content relevance and the URL relevance into an overall relevance of web pages to the query.

The computing devices on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
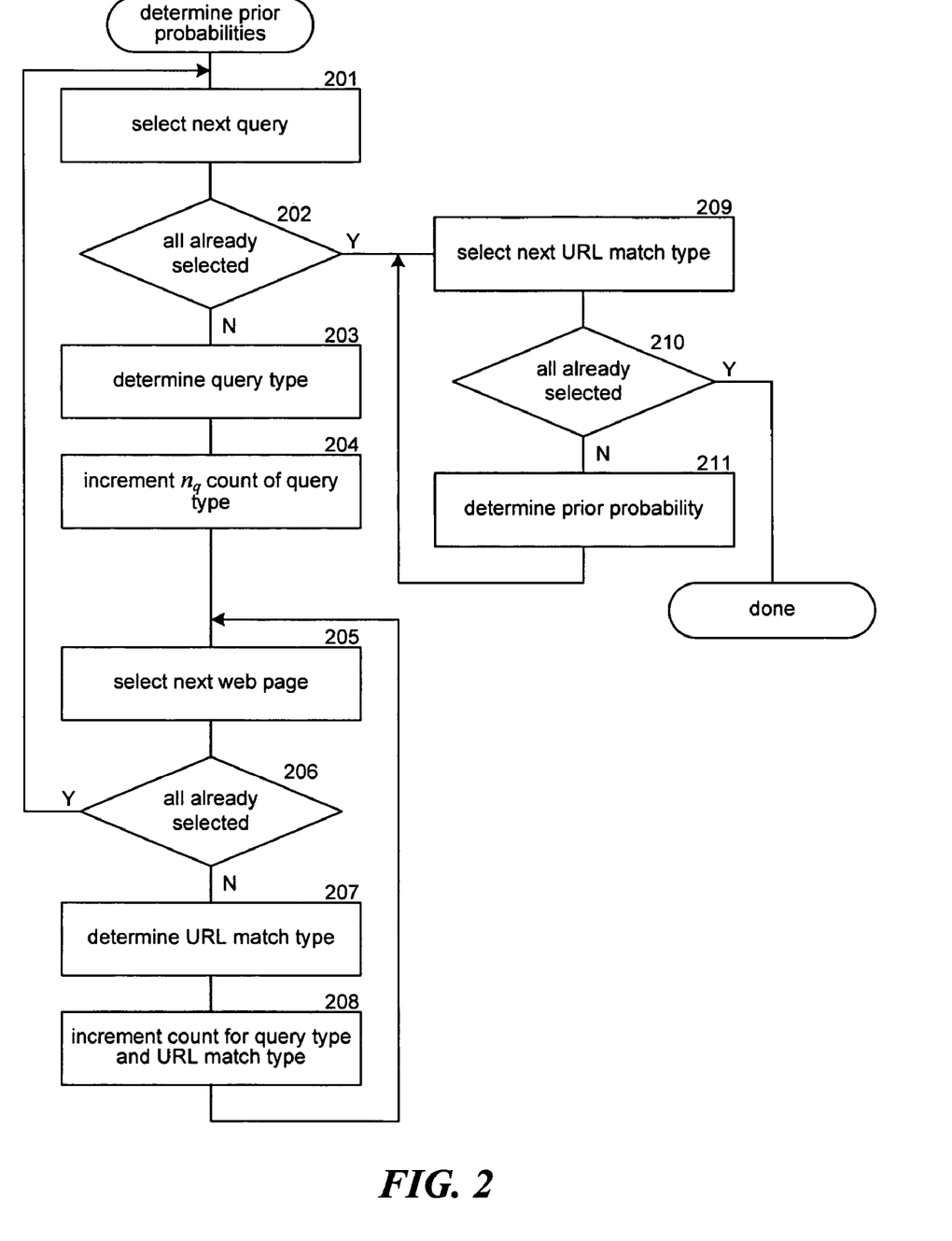
FIG. 2 is a flow diagram that illustrates the processing of the determine prior probabilities component in one embodiment.

FIG. 2 is a flow diagram that illustrates the processing of the determine prior probabilities component in one embodiment. The component is invoked to determine the prior relevance probabilities for URL match types from the queries and web pages of the training set. In blocks 201-208, the component loops selecting each query and accumulating statistics for use in determining the prior relevance probabilities. In block 201, the component selects the next query of the training set. In decision block 202, if all the queries have already been selected, then the component continues at block 209, else the component continues at block 203. In block 203, the component determines the query type as a topic distillation, home page, or named page, which may be provided as part of the training set. In block 204, the component increments the count of the query type. In block 205, the component selects the next web page of the training set. In decision block 206, if all the web pages have already been selected for the selected query, then the component loops to block 201 to select the next query, else the component continues at block 207. In block 207, the component determines the URL match type for the selected web page by invoking the determine URL match type component. In block 208, the component increments a count of the number of web pages of the determined query type for the determined URL match type. The component then loops to block 205 to select the next web page for the selected query. In blocks 209-211, the component loops calculating the prior relevance probability for each URL match type. In block 209, the component selects the next URL match type. In decision block 210, if all the URL match types have already been selected, then the component completes, else the component continues at block 211. In block 211, the component calculates the prior relevance probability for the selected URL match type based on the accumulated statistics and then loops to block 209 to select the next URL match type.

Figure 3:
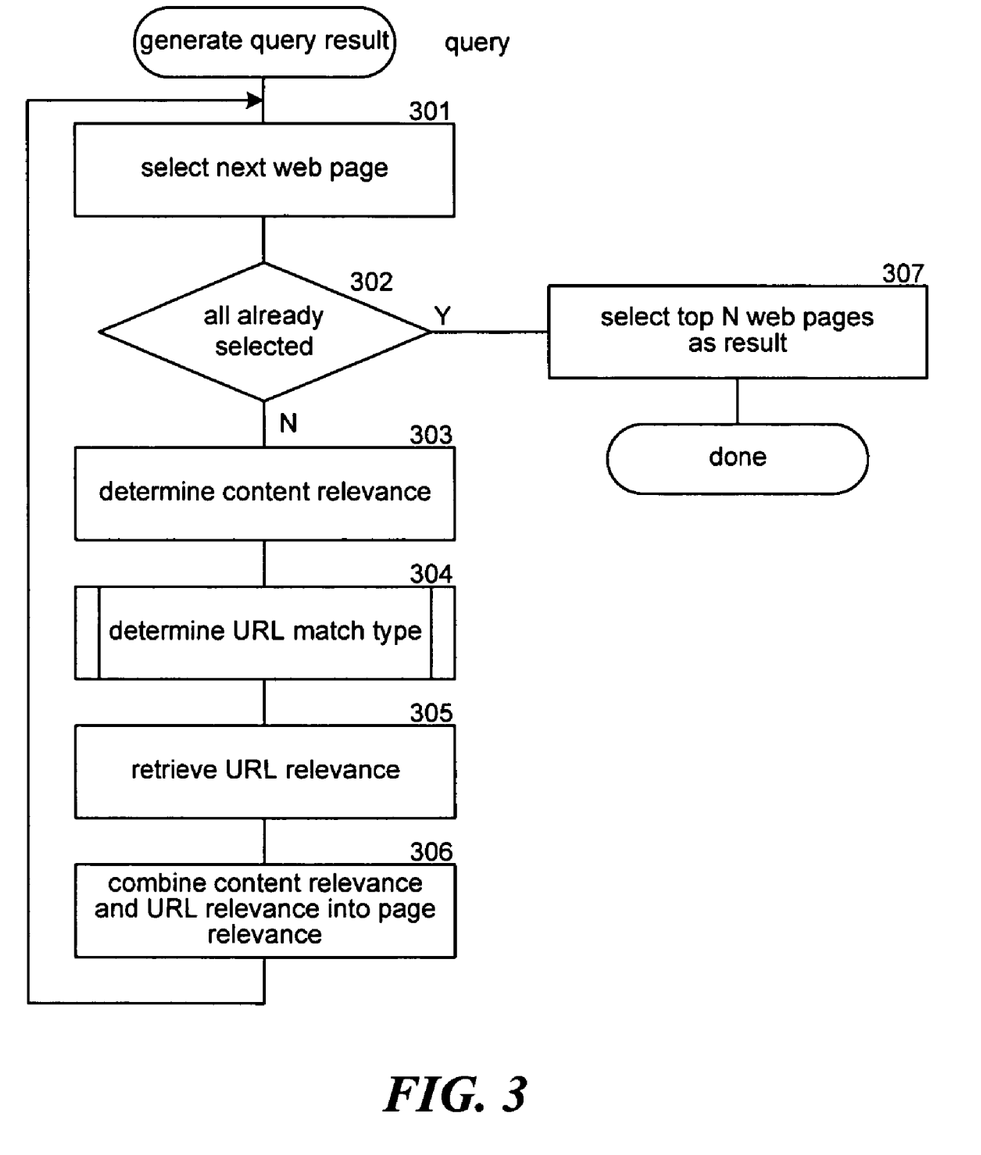
FIG. 3 is a flow diagram that illustrates the processing of the generate query result component in one embodiment.

FIG. 3 is a flow diagram that illustrates the processing of the generate query result component in one embodiment. The component is passed a query and generates a query result from the web pages of the web page store. The component may initially use a conventional search engine to identify a set of relevant web pages. In block 301, the component selects the next web page. In decision block 302, if all the web pages have already been selected, then the component continues at block 307, else the component continues at block 303. In block 303, the component determines the content relevance of the selected web page. In block 304, the component invokes the determine URL match type component to determine the URL match type of the selected web page. In block 305, the component retrieves the URL relevance for the determined URL match type. In block 306, the component combines the content relevance with the URL relevance into an overall relevance for the selected web page. The component then loops to block 301 to select the next web page. In block 307, the component selects the web pages with the highest overall relevance to return as the result. The component then completes.

Figure 4:
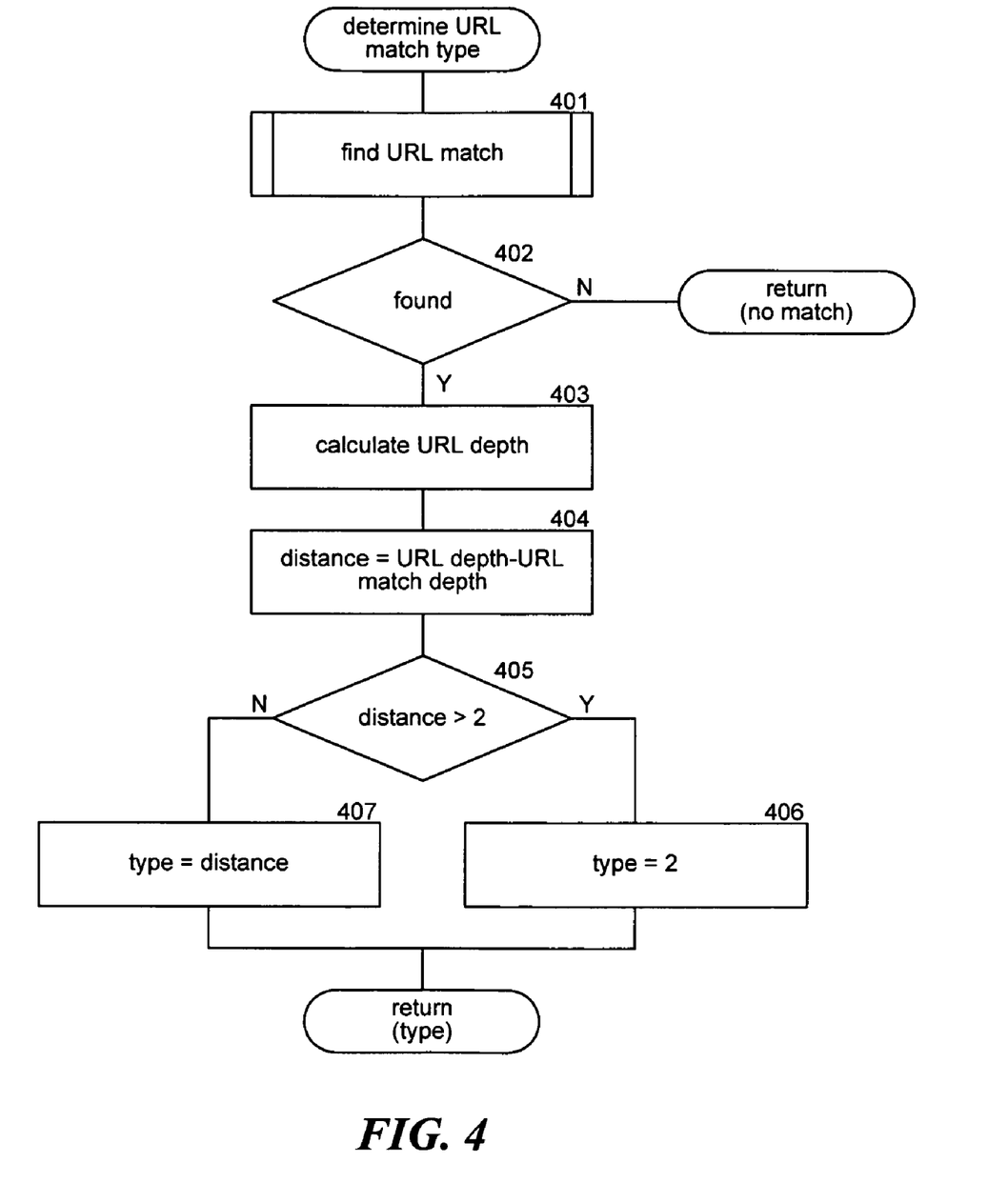
FIG. 4 is a flow diagram that illustrates the processing of the determine URL match type component in one embodiment.

FIG. 4 is a flow diagram that illustrates the processing of the determine URL match type component in one embodiment. The component is passed a query and a URL and determines the corresponding URL match type. In block 401, the component invokes the find URL match component to determine whether there is a match between the passed query and the passed URL. The invoked component may implement an acronym match, a concatenation match, a fuzzy match, or some other match technique such as a conventional match technique. In decision block 402, if a match was found, then the component continues at block 403, else the component returns an indication of no match. In block 403, the component calculates the URL depth of the match. In block 404, the component calculates the distance between the depth of the URL and the depth of the URL match. In decision block 405, if the distance is greater than 2, then the component sets the URL match type to 2 in block 406, else the component sets the URL match type to the calculated distance in block 407. The component then returns the URL match type.

Figure 5:
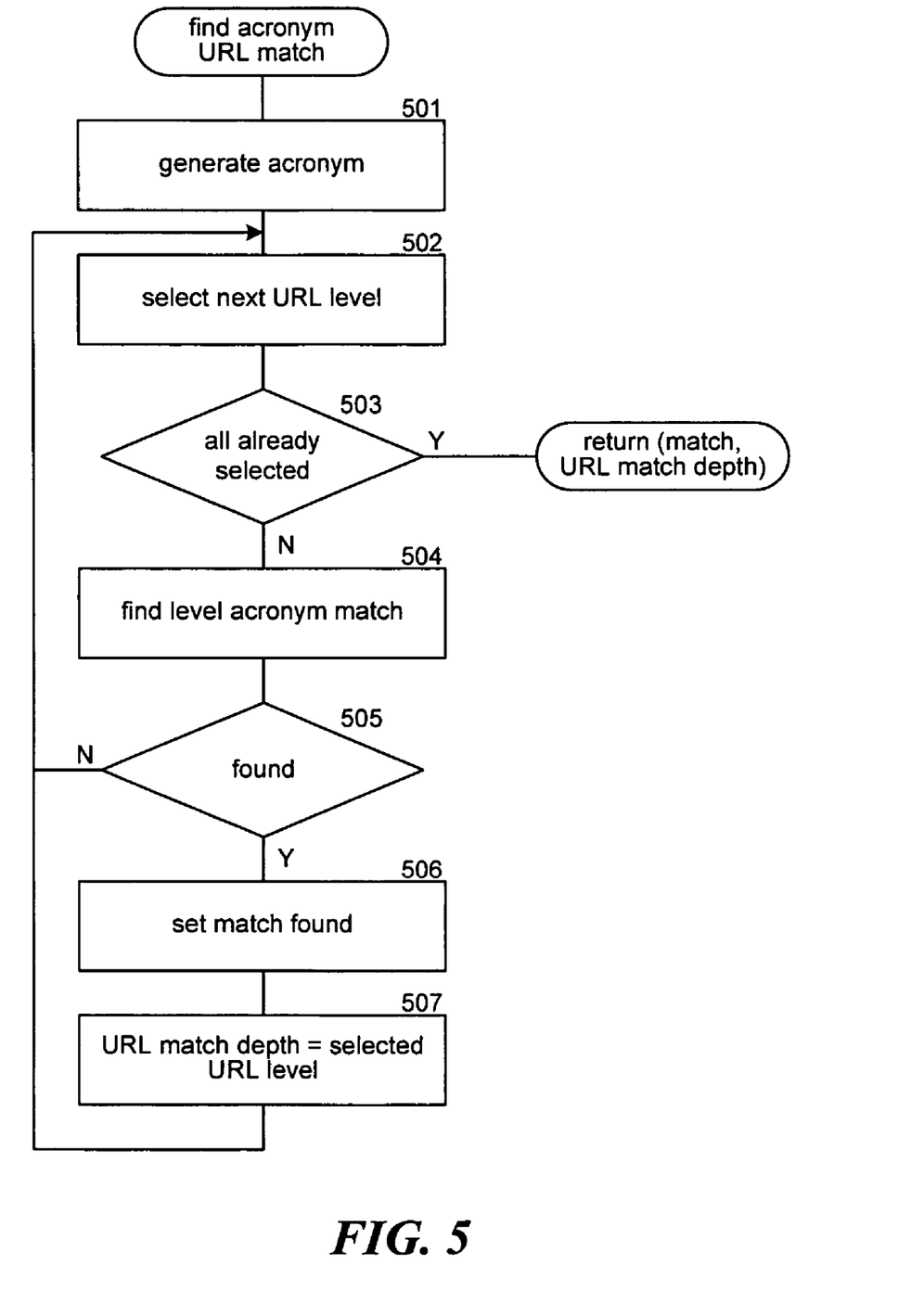
FIG. 5 is a flow diagram that illustrates the processing of a find acronym URL match component in one embodiment.

FIG. 5 is a flow diagram that illustrates the processing of a find acronym URL match component in one embodiment. The component is passed a query and a URL and determines whether the URL contains an acronym match with the query. In block 501, the component generates an acronym from the query. In blocks 502-507, the component loops selecting each URL level and determining whether there is a match within the URL level to the acronym. In block 502, the component selects the next URL level. In decision block 503, if all the URL levels have already been selected, then the component returns an indication of whether there was a match and if so, the URL match depth, else the component continues at block 504. In block 504, the component finds the level of the acronym match. In decision block 505, if a match was found, then the component continues at block 506, else the component loops to block 502 to select the next URL level. In block 506, the component sets an indication that a match was found. In block 507, the component sets the URL match depth to the selected URL level and then loops to block 502 to select the next URL level.

From the foregoing, it will be appreciated that specific embodiments of the system have been described herein for purposes of illustration, but that various modifications may be made without deviating from the spirit and scope of the invention. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the relevance system may define additional URL match types to further refine relevance to the URL match distance. Also, the relevance system may use a document identifier that is the path name used by a file system. Accordingly, the invention is not limited except as by the appended claims.

We claim:

1. A method performed by a computing device for establishing a relationship between relevance of a web page to a query based on a URL of the web page, the URL having levels, each level having a number, the method comprising:
   providing a training set having queries, web pages with URLs, and indications of whether web pages are related to queries;
   establishing from the training set a relationship between relevance of a web page to a query and the distance between the depth of a URL term of the URL of the web page that matches a query term of the query and the depth of the URL, the depth of the URL being the number of levels in the URL and the depth of a URL term being the number of the level of the URL that contains a query term and based on content relevance of content of the web page to the query;
   calculating by the computing device prior probabilities indicating that a web page is relevant to a query based on distances of a matching URL term; and
   establishing relevance of a web page to a query, the web page having content with terms and a URL with URL terms, the query having query terms, the relevance being established based on the calculated prior probabilities of a URL term of the web page matching a query term and based on comparison of terms within the content of the web page to the query terms.

2. The method of claim 1, wherein the prior probabilities are calculated for distances of 0, 1, and 2 or greater.

3. The method of claim 1, wherein the calculating of prior probabilities is based in part on the equation:

$$P(t) = \frac{1}{3}\left[\frac{\sum_{i=1}^{n_{td}} c_i(t)}{n_{td} \cdot N} + \frac{\sum_{j=1}^{n_{hp}} c_j(t)}{n_{hp} \cdot N} + \frac{\sum_{k=1}^{n_{np}} c_k(t)}{n_{np} \cdot N}\right]$$

where $n_{td}$, $n_{hp}$, and $n_{np}$ represent the number of topic distillation, home page, and named page queries, respectively, and $c_i(t)$, $c_j(t)$, and $c_k(t)$ represents the count of topic distillation, home page, and named web pages, respectively, among the top N web pages returned by a query in the training set.

4. The method of claim 1, wherein the establishing of the relevance of a web page to a query includes:
   determining a content relevance of the web page to the query based on content of the web page; and
   combining the determined content relevance with the relevance based on the calculated prior probabilities.

5. The method of claim 4, wherein the content relevance is based on a probability model.

6. The method of claim 4, wherein the content relevance is based on a language model.

7. The method of claim 1, wherein the query term matches a URL term based on a matching technique selected from the group consisting of acronym matching, concatenation matching, and fuzzy matching.

8. A computing device for ranking web pages of a search result of a query, comprising:
   a training set store providing a training set having queries, web pages with URLs, and indications of whether web pages are related to queries, the URLs having levels with each level having a number;
   a memory storing computer-executable instructions that implement:
     a component that calculates from the training set prior probabilities that the web page is relevant to a query based on the distance between the depth of URL terms of the URLs of the web pages that match query terms of the query and the depth of the URLs, the depth of a URL being the number of levels in the URL and the depth of a URL term being the number of the level of a URL that contains a query term wherein a query term matches a URL term based on an expanded matching technique and based on content relevance indicating relevance of content of the web page to the query;
     a component that receives from a user a query having a query term;
     a component that searches for web pages that match the received query, the web pages forming a search result of the query, each web page having content of terms and a URL, a web page matching the received query based on content relevance of the content of the web page to the query as indicated by comparison of terms of the content to the query term;
     a component that identifies relevance of each web page of the search result to the received query based on content relevance of the web page to the query and URL relevance derived from the calculated prior probabilities based on the distance between the depth of a URL term of the URL of the web page that matches the query term of the query based on the expanded matching technique and the depth of the URL of the web page; and a component that provides for display to the user an indication of web pages of the search result, the indication being ordered based on the identified relevance of the web pages to the received query; and a processor that executes the computer-executable instructions stored in the memory wherein a prior probability that a web page is relevant to a query increases as the distance decreases between the depth of a URL term of the URL of the web page that matches a query term of the query and the depth of the URL of the web page.

9. The computing device of claim 8 wherein the content relevance is based on a probability model.

10. The computing device of claim 8 wherein the content relevance is based on a language model.

11. The computing device of claim 8 wherein a query term matches a URL term based on the expanded matching technique selected from the group consisting of acronym matching, concatenation matching, and fuzzy matching.

* * * * *